United States Patent [19]

Aoki

[11] 4,332,544

[45] Jun. 1, 1982

[54] PARISON MOLDING APPARATUS IN AN INJECTION STRETCHING BLOW MOLDING MACHINE

[76] Inventor: Katashi Aoki, 6037, Ohazaminamijo, Sakakimachi, Hanishinagun, Naganoken, Japan

[21] Appl. No.: 120,086

[22] Filed: Feb. 8, 1980

[30] Foreign Application Priority Data

Feb. 16, 1979 [JP] Japan ............................. 54-19370[U]

[51] Int. Cl.³ .......................... B29C 17/07; B29F 1/06
[52] U.S. Cl. ..................................... 425/529; 425/526; 425/533; 425/567; 425/574; 425/576; 425/589
[58] Field of Search ............... 425/533, 567, 574, 575, 425/589, 526, 529, 576

[56] References Cited

U.S. PATENT DOCUMENTS

| | | |
|---|---|---|
| 1,588,023 | 6/1926 | Gutteridge ..................... 425/567 X |
| 3,337,667 | 8/1967 | Ninneman . |
| 3,357,045 | 12/1967 | Ninneman . |
| 3,850,562 | 11/1974 | Takeuchi et al. . |
| 4,105,391 | 8/1978 | Aoki ................................ 425/526 |

*Primary Examiner*—Jan H. Silbaugh
*Attorney, Agent, or Firm*—Fulwider, Patton, Rieber, Lee & Utecht

[57] ABSTRACT

In an injection molding apparatus in which an injection device imposes a touching force on an injection mold in a direction perpendicular to the direction of the clamping force for closing the mold cavity, an apparatus is provided which imposes a force on the injection mold of an equal magnitude an in an opposite direction to the injection device touching force. The apparatus can be a hydraulic ram which is driven by fluid from the same line that supplies fluid to drive the touching motion of the injection device.

3 Claims, 3 Drawing Figures

PARISON MOLDING APPARATUS IN AN INJECTION STRETCHING BLOW MOLDING MACHINE

BACKGROUND AND SUMMARY OF THE INVENTION

This invention relates to an injection molding device and more particularly to a parison molding device disposed on an injection stretching blow molding machine.

In the parison molding device, a parison molding mold along with a mold clamping device is disposed at a right angle to a transfer board which is rotated intermittently about a support shaft. An injection device is located at one side of the parison molding mold, and accordingly, nozzle touching is achieved at a right angle to the mold clamping direction. Such an arrangement poses a drawback that the mold laterally oscillates merely by application of the nozzle touching force to the side since the mold is urged from opposite ends thereof by the mold clamping device and since there is nothing provided at the opposite side of the mold to receive the nozzle touching force.

While the oscillation of the mold is in the range of a very minor dimension, it results in an uneven wall thickness distribution in the molded articles, particularly in cylindrical and elongated molded articles such as parisons. Consequently, it is difficult to form a parison which will, when subsequently blow molded into a hollow molded article, have an even distribution of wall thickness, as is desired.

The present invention has been achieved in order to eliminate those drawbacks noted above and provides an arrangement wherein the side of the mold opposite the nozzle touch is urged by a force equal to the nozzle touching force only when nozzle touching takes place, thereby preventing displacement and oscillation of the mold due to the nozzle touching force and preventing occurrence of uneven wall thickness of a molded article while allowing free opening and closing of the mold.

The present invention will be further described by way of a vertical injection molding machine shown in the drawings.

BRIEF DESCRIPTION OF THE DRAWINGS

The drawings show one embodiment of the present invention, in which.

DETAILED DESCRIPTION

Figure 1:
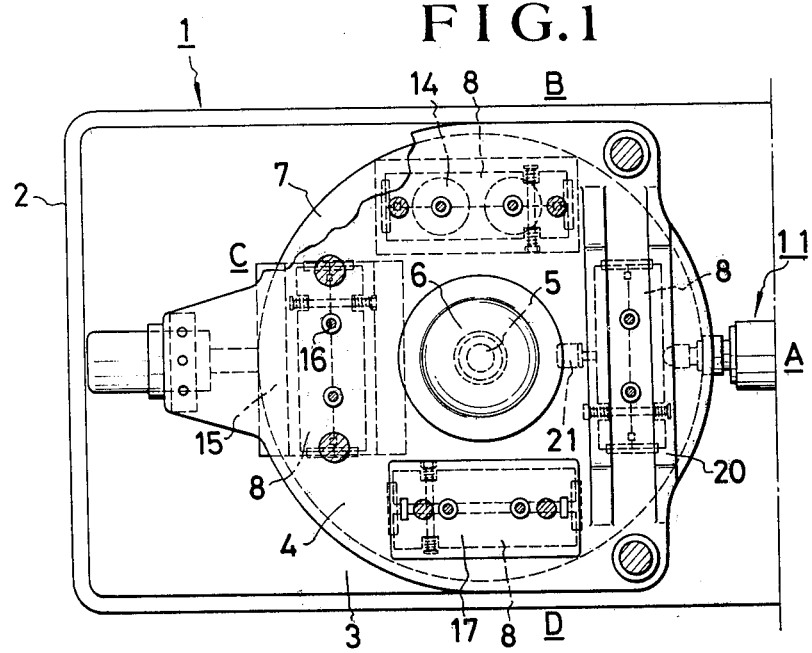
FIG. 1 is a plan view of an injection stretching blow molding machine partly cut away.

A molding machine 1 has a lower base board 3 on a machine bed 2 and an upper base board 4 disposed thereabove with a given spacing therefrom to form a molding vacant space between both the base boards. At the underside of the upper base board 4 there is provided a transfer board 7 which is intermittently rotated, by means of a motor 6, through an angle of 90 degrees about a central support shaft 5. Neck molds 8, 8 which also serve as holding members for the parisons are radially mounted at four locations on the under surface of the transfer board and are arranged to be opened and closed freely to releasably retain the parisons on the transfer board 7. A parison molding stage A, a heating stage B, a stretching blow molding stage C, and a molded article releasing stage D are disposed in order at respective stopping positions of the neck molds 8

On the parison molding stage A there is provided a parison molding mold 10 (FIG. 2) along with a mold clamping device 9 at a right angle, i.e., perpendicular to the horizontal transfer board 7, and an injection device 11 is mounted at one side of the parison molding mold 10 in a manner such that the injection device is retractably moved by means of a hydraulic device 12.

In the heating stage B (FIG. 1), a heating furnace 14 is adapted to receive an injection molded parison 13, and for this purpose the furnace is mounted movably up and down to the side of the lower base board 3. In the stretching blow molding stage C, a stretching device is mounted above the upper base board 4 and includes a rod 16, which extends through the upper base board 4 and neck mold 8 to stretch the parison 13 in an axial direction. Also, a radially opening and closing blow molding mold 15 is disposed on the lower base board 2. In the mold releasing stage D, there is provided a device 17 which extends through the upper base board 4 to push open the neck mold 8 for release of the molded article, whereby a continuous operation from molding of the parison 13 to stretching blow molding and releasing of the molded article may be carried out by intermittent rotation of the transfer board 7.

Figure 2:
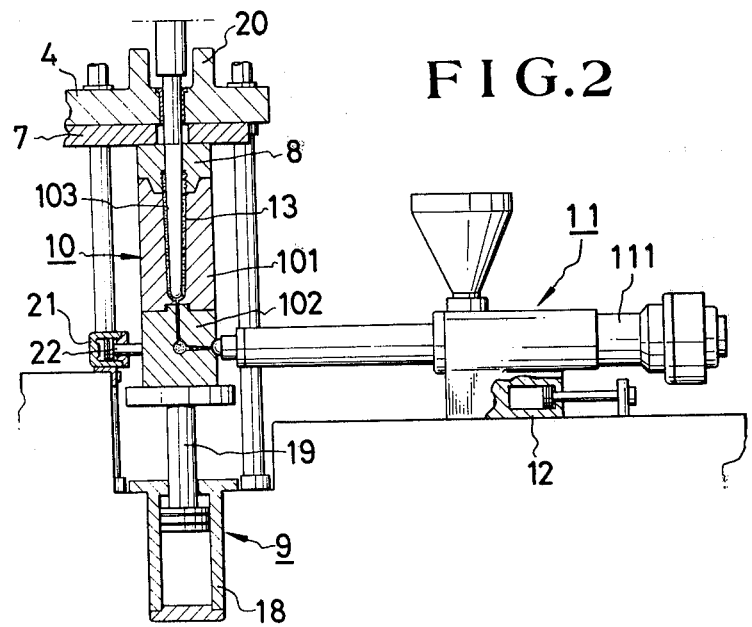
FIG. 2 is a longitudinal side view of the parison molding stage.

FIG. 2 shows the detail of the parison molding stage A. An upwardly directed mold clamping cylinder 18 is mounted on the machine bed 2, and a base mold 102, having a cavity mold 101 of the parison molding mold 10 placed above and secured thereto, is mounted on the top of a vertically movable mold clamping ram 19. To receive the upward force of the mold clamping ram 19, a pressure receiving plate 20 is disposed above the transfer board 7 and is provided with an aperture through which a mold closing parison core 103 extends. With this arrangement, the upward force of the mold clamping ram 19 forces the cavity mold 101 against the neck mold 8 to close the parison mold 10, and the upward force of the ram 19 is received by the plate 20.

The retractable injection device 11 horizontally disposed on the machine bed is designed so that the nozzle is brought into touch, by means of the hydraulic device 12 located at the rear of the apparatus with the gate opening on the side of the base mold 102, that is, at a right angle to the clamping direction of the mold.

Figure 3:
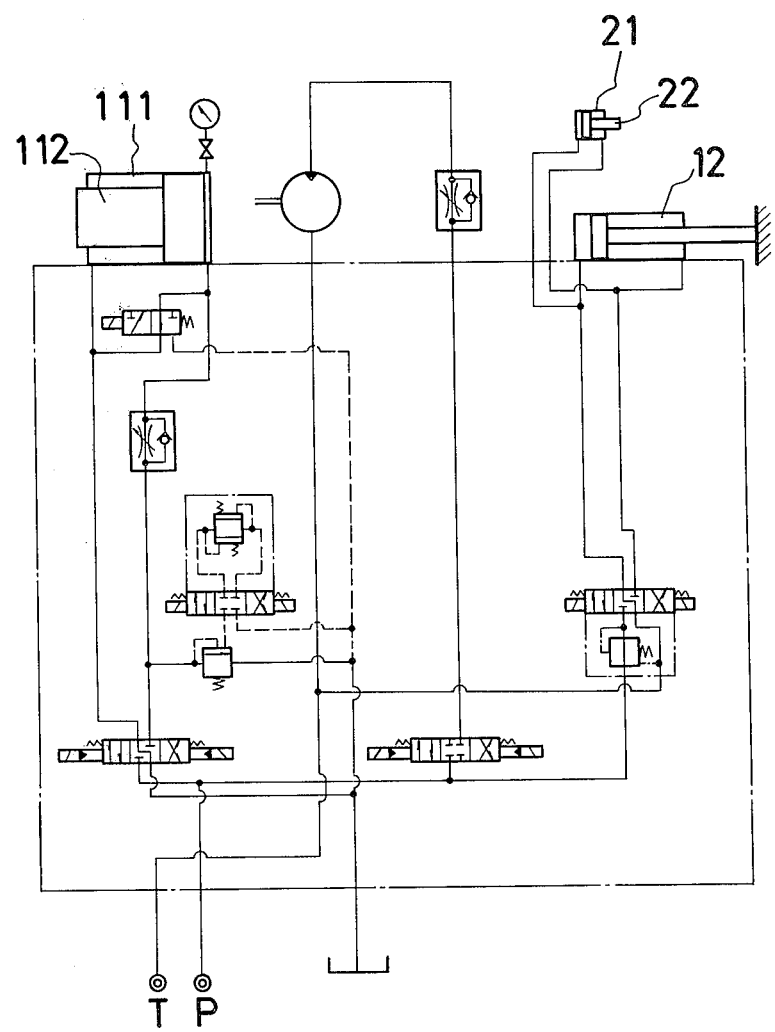
FIG. 3 is a hydraulic circuit diagram.

A hydraulic cylinder 21 for balancing the nozzle touching force contacts the side of the base mold 102 opposite the nozzle touch side, is secured to the machine bed, and has its hydraulic circuit communicated with the hydraulic device 12 so as to be actuated in synchronism with the hydraulic device 12 (FIG. 3). That is, the hydraulice cylinder 21 can be driven by fluid from the same line that supplies fluid to drive the hydraulic device 12 on the injection device 11. The plunger 22 in the hydraulic cylinder 21 is arranged in line with the injection device 11, and by this arrangement, the plunger 22 exerts a force on the base mold 102 which is equal and opposite to the touching force of the injection device 11.

Reference numeral 111 designates an injection cylinder, and 112 an injection ram.

In this embodiment wherein the side of the base mold 102 opposite the nozzle touch side is pressed by a force equal to the nozzle touching force at the time of nozzle touching, the nozzle and the plunger 22 come to touch with both sides of the base mold 102 in coaxial fashion only when injection molding takes place, and thus the plunger 22 comprises no barrier when the mold is opened and closed by upward and downward movement of the mold clamping ram 19.

Accordingly, with the aforementioned arrangement, the injection molding is carried out in the state in which the side of the mold opposite the nozzle touch side is pressed by a force equal to the nozzle touching force, and hence, it is possible, when the nozzle touching is made at the right angle to the mold clamping direction, to prevent displacement and oscillation of the mold caused by the nozzle touching force and to prevent uneven wall thickness of the molded products even when a plurality of molds are stacked. The invention further offers characteristics that since the side of the mold opposite the nozzle touch side is merely pressed, molded cycles are not affected, and that if the means for offsetting the nozzle touching force is set so as to synchronize with advance and withdrawal of the injection device, the injection molding can be carried out similarly to that case of prior devices without making special operations.

I claim:

1. In an injection molding machine including a cavity mold which is movable for clamping said mold in a closed position for receiving injected material to be molded, said cavity mold having a gate at one side thereof and said machine including an injection device arranged to move toward and away from said gate in a direction generally perpendicular to the clamping movement of said cavity mold for applying a touching force to said gate during injection of said material, said motion of said injection device being provided by a fluid actuated device supplied with fluid from a pressure supply line; the improvement comprising:

a fluid actuated ram for applying a force to the side of said cavity mold opposite said gate, said force being equal and opposite to the touching force of said injection device, and said fluid actuated ram being arranged to operate in synchronism with the motion of said injection device by being in communication with said supply line.

2. The improvement as set forth in claim 1 wherein said force applied to the side of said cavity mold opposite said gate is in line with the touching force of said injection device.

3. A parison molding apparatus in an injection stretching blow molding machine comprising:

a stationary support structure;

a transfer board above said support structure adapted for intermittent rotation about a support shaft, said transfer board provided at the underside thereof with a plurality of neck molds in circumferentially spaced relation;

a plurality of stages spaced on said support structure for injection stretching blow molding, including an injection stage;

a mold clamping device on said support structure at said injection stage;

a parison mold at said injection stage, said mold arranged at a right angle to said transfer board and mounted on said mold clamping device for vertical clamping movement toward and away from said transfer board;

an injection device at said injection stage disposed at one side of said parison mold and arranged to move toward and away from said one side of said mold to impose a touching force on said mold in a direction generally perpendicular to said clamping movement, said injection device having a hydraulic cylinder for effecting said movement; and a hydraulic ram at said injection stage arranged to move toward and away from the opposite side of said parison mold, said hydraulic ram being in line with said injection device and being operated by a hydraulic line in communication with said hydraulic cylinder on said injection device for imposing a force on said parison mold in line with said touching force and having an equal magnitude and opposite direction to said touching force.

* * * * *